(12) United States Patent
Hashimoto et al.

(10) Patent No.: US 11,059,119 B2
(45) Date of Patent: Jul. 13, 2021

(54) SOLDERING APPARATUS AND SOLDERING METHOD

(71) Applicant: SENJU METAL INDUSTRY CO., LTD., Tokyo (JP)

(72) Inventors: Noboru Hashimoto, Toyama (JP); Takahiro Kasama, Toyama (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/740,299

(22) Filed: Jan. 10, 2020

(65) Prior Publication Data

US 2020/0331086 A1    Oct. 22, 2020

(30) Foreign Application Priority Data

Apr. 22, 2019    (JP) .............................. JP2019-080679

(51) Int. Cl.
*B23K 3/00* (2006.01)
*B23K 3/06* (2006.01)

(52) U.S. Cl.
CPC .................................. *B23K 3/0653* (2013.01)

(58) Field of Classification Search
CPC ............. B23K 1/08–085; B23K 3/0646–0684
USPC .................................... 228/33, 37, 256, 260
See application file for complete search history.

(56) References Cited

U.S. PATENT DOCUMENTS

| | | | | |
|---|---|---|---|---|
| 3,198,414 A | * | 8/1965 | Tardoskegyi | B23K 3/0653 228/37 |
| 3,430,332 A | * | 3/1969 | Roczey-Koller | B23K 3/0653 228/262 |
| 3,724,418 A | * | 4/1973 | McLain | H05K 3/3468 118/69 |
| 3,752,383 A | * | 8/1973 | Allen | B23K 3/0653 228/37 |
| 3,941,088 A | * | 3/1976 | Ronafoldi | C23C 2/00 118/620 |
| 3,993,235 A | * | 11/1976 | Boynton | B23K 3/0653 228/37 |
| 4,011,980 A | * | 3/1977 | Dvorak | B23K 3/0653 228/180.1 |
| 4,410,127 A | * | 10/1983 | Bodewig | B23K 3/0653 228/180.21 |

(Continued)

FOREIGN PATENT DOCUMENTS

| | | | | |
|---|---|---|---|---|
| DE | 102006008779 A1 | * | 8/2007 | ............. B23K 1/085 |
| EP | 0139455 A1 | * | 5/1985 | ........... B23K 3/0653 |

(Continued)

OTHER PUBLICATIONS

Notice of Reasons for Refusal in corresponding Japanese Patent Application No. 2019-080679, dated Jun. 4, 2019, with English machine translation.

*Primary Examiner* — Kiley S Stoner (74) *Attorney, Agent, or Firm* — Harness, Dickey & Pierce, P.L.C.

(57) ABSTRACT

A soldering apparatus 100 including: a chamber 120 configured to contain solder and include an opening 122 configured to discharge the solder in a bottom surface or a side surface; a pump 140 configured to transport the solder to the chamber 120; and an inner bath 160 configured to communicate with the opening 120 and perform soldering using the solder fed through the opening 120.

6 Claims, 4 Drawing Sheets

(56) References Cited

U.S. PATENT DOCUMENTS

| | | | | |
|---|---|---|---|---|
| 4,465,219 A * | 8/1984 | Kondo | B23K 1/08 | 228/37 |
| 4,526,313 A * | 7/1985 | Hug | B23K 3/0653 | 228/180.1 |
| 4,530,458 A * | 7/1985 | Kondo | B23K 3/0653 | 228/180.1 |
| 4,540,114 A * | 9/1985 | Pachschwoll | B23K 3/0653 | 228/37 |
| 4,651,916 A * | 3/1987 | Ciniglio | B23K 3/0653 | 228/180.1 |
| 5,203,489 A * | 4/1993 | Gileta | B23K 3/0653 | 228/219 |
| 5,209,389 A * | 5/1993 | Sullivan | B23K 3/0653 | 228/260 |
| 6,050,473 A * | 4/2000 | Masuda | B23K 1/085 | 228/37 |
| 7,988,030 B2 * | 8/2011 | Zen | B23K 3/0653 | 228/37 |
| 2008/0093417 A1 * | 4/2008 | Takaguchi | B23K 3/0653 | 228/37 |
| 2009/0212094 A1 * | 8/2009 | Zen | B23K 3/0653 | 228/260 |
| 2009/0321498 A1 * | 12/2009 | Zen | B23K 3/0653 | 228/37 |
| 2010/0001047 A1 * | 1/2010 | Zen | B23K 3/0653 | 228/260 |
| 2010/0163599 A1 * | 7/2010 | Zen | B23K 1/085 | 228/37 |
| 2010/0163600 A1 * | 7/2010 | Sato | B23K 3/0646 | 228/101 |
| 2010/0200644 A1 * | 8/2010 | Tombs | B23K 3/0653 | 228/219 |
| 2011/0226843 A1 * | 9/2011 | Yanaros | B23K 1/203 | 228/260 |
| 2016/0052074 A1 * | 2/2016 | Hueste | B23K 3/0676 | 228/219 |
| 2018/0229322 A1 * | 8/2018 | Hayashi | B23K 3/0638 | |

FOREIGN PATENT DOCUMENTS

| | | | | |
|---|---|---|---|---|
| EP | 0212911 A2 * | 3/1987 | | B23K 3/0653 |
| GB | 2360237 A * | 9/2001 | | B23K 3/0653 |
| GB | 2366536 A * | 3/2002 | | B23K 3/0653 |
| JP | S48-098520 | 12/1973 | | |
| JP | S53-138953 A | 12/1978 | | |
| JP | H0847772 A | 2/1996 | | |
| JP | H1071466 A | 3/1998 | | |
| JP | 2005-353719 A | 12/2005 | | |
| JP | 2011-140039 A | 7/2011 | | |
| WO | WO-2007116853 A1 * | 10/2007 | | B23K 3/0653 |

* cited by examiner

SOLDERING APPARATUS AND SOLDERING METHOD

CROSS-REFERENCE TO RELATED APPLICATION

This application is based upon and claims benefit of priority from Japanese Patent Application No. 2019-080679 filed on Apr. 22, 2019, the entire contents of which are incorporated herein by reference.

TECHNICAL FIELD

The present invention relates to a soldering apparatus and a soldering method.

BACKGROUND ART

Soldering apparatuses have been used to solder an electronic component on a circuit board. The soldering apparatus includes a reflow soldering apparatus and a flow soldering apparatus. As the flow soldering apparatus, a jet soldering apparatus, a dip soldering apparatus, and the like are known. The jet soldering apparatus includes a solder bath for containing molten solder, a jet nozzle set in the solder bath, and a pump. The pump transports solder contained in the solder bath to the jet nozzle. Thereafter, the transported solder is jetted through the jet nozzle. At this time, the jet soldering apparatus causes a substrate to pass over the molten solder jetted through the jet nozzle. Thus, the jet soldering apparatus performs soldering with respect to the substrate. Moreover, the solder jetted through the jet nozzle falls into the solder bath and is again fed to the pump. That is, the jet soldering apparatus performs soldering on the substrate using solder that circulates inside the apparatus. Meanwhile, the dip soldering apparatus includes a solder bath that contains molten solder. The lower surface of a substrate is dipped into the liquid surface of the contained solder. Thus, the dip soldering apparatus performs soldering with respect to the substrate.

The jet soldering apparatus and the dip soldering apparatus perform soldering on a substrate in the manner described above. In the soldering process, however, molten high-temperature solder contacts air. When the high-temperature solder contacts air, the solder reacts with oxygen. The solder reacts with oxygen to form solder oxide (dross). Therefore, in the jet soldering apparatus or the dip soldering apparatus, dross is contained in the solder used for soldering, and the dross can be adhered to the substrate. When the dross is adhered to the substrate, the substrate itself looks bad, and the substrate on which soldering has been performed has reduced commercial value. Moreover, when large dross is adhered to the substrate, short circuit can occur between adjacent soldered portions or insulation resistance can be reduced. Therefore, in some cases, the flow soldering apparatus uses a solder bath that is configured to suppress adhesion of dross to the substrate.

For example, PTL 1 describes a jet solder bath configured to suppress adhesion of dross to a substrate. The jet solder bath described in PTL 1 includes a jet pump and a jet nozzle in a body. Moreover, the body is divided into an upper chamber and a lower chamber by a base plate. The jet nozzle and the jet pump are set on the base plate. When the jet pump pumps solder from the upper chamber to the lower chamber, the solder passes through the lower chamber and is jetted through the jet nozzle to the upper chamber. Then, when a printed circuit board contacts waves jetted through the jet nozzle, soldering is performed on a soldered portion of the printed circuit board.

Moreover, the upper chamber of the jet solder bath described in PTL 1 is separated into a nozzle side and a pump side by a partition plate. The upper part of the partition plate protrudes from the liquid surface, and the lower part of the partition plate is held below the liquid surface. Moreover, oxide (dross) the specific gravity of which is lower than that of the molten solder floats near the liquid surface of the molten solder. Therefore, the oxide (dross) floating on the liquid surface is prevented from moving from the nozzle side to the pump side by the partition plate. In other words, in this jet solder bath, the oxide (dross) on the nozzle side does not move from the nozzle side to the pump side or is sucked by the jet pump. That is, with the jet solder bath described in PTL 1, the oxide (dross) on the nozzle side hardly adheres to the substrate.

CITATION LIST

Patent Literature

PTL 1: JP 2005-353719A

SUMMARY OF INVENTION

Technical Problem

As described above, the jet solder bath described in PTL 1 includes the partition plate and prevents the dross (oxide) from moving from the nozzle side to the pump side. Therefore, in the upper chamber, the dross hardly moves from the nozzle side to the pump side. However, on the nozzle side, relatively large dross (dross that is about 1.5 cm square) and powdery fine dross (dross having a diameter of 1 mm or less) are generated. The fine dross, which is susceptible to the influence of low, is caught in the flow of the solder jetted through the jet nozzle, passes below the partition plate, and somewhat moves to the pump side. Therefore, the fine dross can accumulate on the liquid surface on the pump side over time.

Moreover, in the jet solder bath described in PTL 1, a solder liquid surface is also formed on the pump side. Then, a shaft linked to the screw of the jet pump is linked to a screw for pumping the molten solder in the solder liquid across the liquid surface. The shaft rotates, and a small amount of atmosphere is caught in the liquid surface of the solder around the rotary shaft. Thus, the fine dross is also generated on the pump side, and the fine dross can accumulate on the liquid surface on the pump side.

Moreover, when the dross is present on the liquid surface of the solder on the pump side, the jet pump can suck the dross together with the molten solder. That is, the dross can be jetted through the jet nozzle together with the molten solder and adhered to the substrate.

Thus, it is an object of the present invention in view of the aforementioned problem to provide a soldering apparatus and a soldering method in which dross is less adhered to a substrate in comparison with that of the conventional art.

Solution to Problem (Aspect 1)

A soldering apparatus according to aspect 1 includes:

a chamber configured to contain solder and include an opening configured to discharge the solder in a bottom surface or a side surface;

a pump configured to transport the solder to the chamber; and an inner bath configured to communicate with the opening and perform soldering using the solder fed through the opening.

When the dross is contained in the solder, the dross the specific gravity of which is lower than that of the solder floats in an upper part of the solder and is positioned near the liquid surface of the solder. Therefore, in the soldering apparatus according to aspect 1, when the solder containing the dross is contained in the chamber, the dross is positioned near the liquid surface of the solder in the chamber. Moreover, the opening for discharging the solder is positioned in the bottom surface or the side surface of the chamber. Thus, when the height of the liquid surface of the solder in the chamber is adjusted to a position away from the opening, passage of the dross, which floats near the liquid surface, through the opening can be suppressed. Accordingly, the soldering apparatus can feed the solder that scarcely contains the dross to the inner bath, such that the dross is hardly adhered to the substrate.

(Aspect 2)

Regarding a soldering apparatus according to aspect 2, the soldering apparatus according to aspect 1, wherein the opening is present in the bottom surface of the chamber.

In the soldering apparatus according to aspect 2, the opening is present in the bottom surface below the side surface in the direction of gravity. Therefore, the opening is positioned farther from the liquid surface as compared with the case where the opening is present in the side surface. In other words, it becomes more difficult for the dross to pass through the opening. Accordingly, with the soldering apparatus, the dross is hardly adhered to the substrate as compared with the soldering apparatus according to aspect 1.

(Aspect 3)

Regarding a soldering apparatus according to aspect 3, the soldering apparatus according to aspect 1 or 2, wherein the pump transports the solder from a lower side to an upper side in the direction of gravity.

When the pump transports the solder from the upper side to the lower side in the direction of gravity, the pump sucks the solder on the upper side. In other words, the pump tends to suck the dross positioned near the liquid surface of the solder. Therefore, the pump can suck the solder together with a lot of dross. Then, when the pump sucks the dross, the pump cannot transport the solder for the amount of the sucked dross. In other words, the amount of solder to be transported by the pump is reduced, and the efficiency of transport can be reduced.

Furthermore, when the pump transports a lot of dross into the chamber, the density of the dross in the chamber increases. In this case, the dross tends to pass through the opening of the chamber.

However, in the soldering apparatus according to aspect 3, the pump transports the solder from the lower side to the upper side in the direction of gravity. In other words, the pump sucks the solder at the position away from the liquid surface. Therefore, the pump hardly sucks the dross, and therefore the transport efficiency of the pump is hardly reduced. Moreover, in the soldering apparatus, the pump hardly sucks the dross, an increase in density of the dross in the chamber can be suppressed. As a result, the amount of dross that passes through the opening can be reduced, and adhesion of the dross to the substrate can be prevented.

(Aspect 4)

Regarding a soldering apparatus according to aspect 4, the soldering apparatus according to any one of aspects 1 to 3, wherein the pump comprises a screw pump.

The soldering apparatus according to aspect 4 can embody the configuration of aspect 3 that transports the solder from the lower side to the upper side in the direction of gravity, using a screw pump.

(Aspect 5)

Regarding a soldering apparatus according to aspect 5, the soldering apparatus according to any one of aspects 1 to 4, wherein the chamber includes a ventilation port configured to communicate with atmosphere.

In the soldering apparatus according to aspect 5, if the chamber does not include the ventilation port, the solder fed to the chamber by the pump is pumped through the opening by the pressure generated by the pump. Therefore, the dross positioned near the liquid surface of the solder in the chamber becomes more likely to be carried away under the pressure generated by the pump to pass through the opening.

However, the chamber of the soldering apparatus according to aspect 5 includes the ventilation port. Thus, the solder fed to the chamber by the pump is once accumulated in the chamber. Then, as a result of an increase in solder in the chamber, the pressure of the opening of the chamber rises, and the raised pressure pumps the solder through the opening. That is, the dross positioned near the liquid surface of the solder in the chamber is not pumped to the opening by the pressure by the pump. Accordingly, the soldering apparatus according to aspect 5, which includes the ventilation port, suppresses passage of the dross through the opening.

(Aspect 6)

Regarding a soldering apparatus according to aspect 6, the soldering apparatus according to any one of aspects 1 to 5, wherein the inner bath contains the solder and includes a discharge hole configured to discharge the contained solder in a bottom surface.

With the soldering apparatus according to aspect 6, the solder fed from the chamber and contained in the inner bath is discharged through the discharge hole of the inner bath. Thus, the inner bath contains a lot of solder that is freshly fed from the chamber and scarcely contains dross. Therefore, the soldering apparatus can perform soldering using the solder, which scarcely contains dross, in the inner bath, and can prevent soldering using the solder in which the dross is generated.

(Aspect 7)

Regarding a soldering apparatus according to aspect 7, the soldering apparatus according to aspect 6, further including:

an outer bath;

a base plate configured to divide an interior of the outer bath into an outer bath upper portion and an outer bath lower portion configured to receive the solder discharged through the discharge hole, the base plate including:

a solder intake port configured to link the outer bath upper portion and the outer bath lower portion, an inner bath coupling port configured to communicate with the inner bath, a chamber coupling port configured to communicate with the chamber, and an opening coupling port configured to communicate with the opening; and a shield plate configured to divide the outer bath lower portion into a first lower portion configured to include a flow passage from the solder intake port to the chamber coupling port and a second lower portion configured to include a flow passage from the opening coupling port to the inner bath coupling port, wherein the pump transports the solder from the first lower portion to the chamber.

In the soldering apparatus according to aspect 7, the solder discharged through the discharge hole of the inner bath is fed to the outer bath upper portion. The solder in the outer bath upper portion moves by gravity from the solder intake port to the first lower portion. Thereafter, the solder of the first lower portion is transported to the chamber by the pump. Then, the solder of the chamber passes through the opening, the opening coupling port, the second lower portion, and the inner bath coupling port in this order, and is fed to the inner bath. Thereafter, the solder contained in the inner bath is discharged through the discharge hole of the inner bath and is again fed to the outer bath upper portion. Thus, with the soldering apparatus according to aspect 7, the solder can be circulated in the apparatus, and the solder can circulate by convection. Then, the soldering apparatus can have uniform temperature of the solder inside the apparatus by means of the convection of the solder and feed the solder with stable temperature to the inner bath. In other words, the solder in the inner bath can be stabilized at a temperature optimum for soldering. Therefore, the soldering apparatus can perform soldering at a temperature optimum for soldering.

(Aspect 8)

A soldering method according to aspect 8 includes:

discharging solder through an opening in a bottom surface or a side surface by a chamber configured to contain the solder;

transporting the solder to the chamber by a pump; and performing soldering using the solder fed through the opening by an inner bath configured to communicate with the opening.

In the soldering method according to aspect 8, when the solder containing the dross is contained in the chamber, the dross is positioned near the liquid surface of the solder in the chamber. Moreover, the opening for discharging the solder is positioned in the bottom surface or the side surface. Therefore, similar to aspect 1, it is difficult for the dross to pass through the opening together with the solder, and the dross hardly passes through the opening. Therefore, the soldering method can feed the solder that scarcely contains the dross to the inner bath. Then, the soldering method can perform soldering using the solder. In other words, with the soldering method, the dross is hardly adhered to the substrate.

Advantageous Effects of Invention

According to the present invention, dross is less adhered to a substrate in comparison with that of the conventional art.

DESCRIPTION OF EMBODIMENTS

An embodiment of the present invention is described below with reference to the drawings. In the drawings described below, the same or corresponding constituent elements are designated the same reference numerals and will not be elaborated.

First Embodiment

<Configuration>

Figure 1:
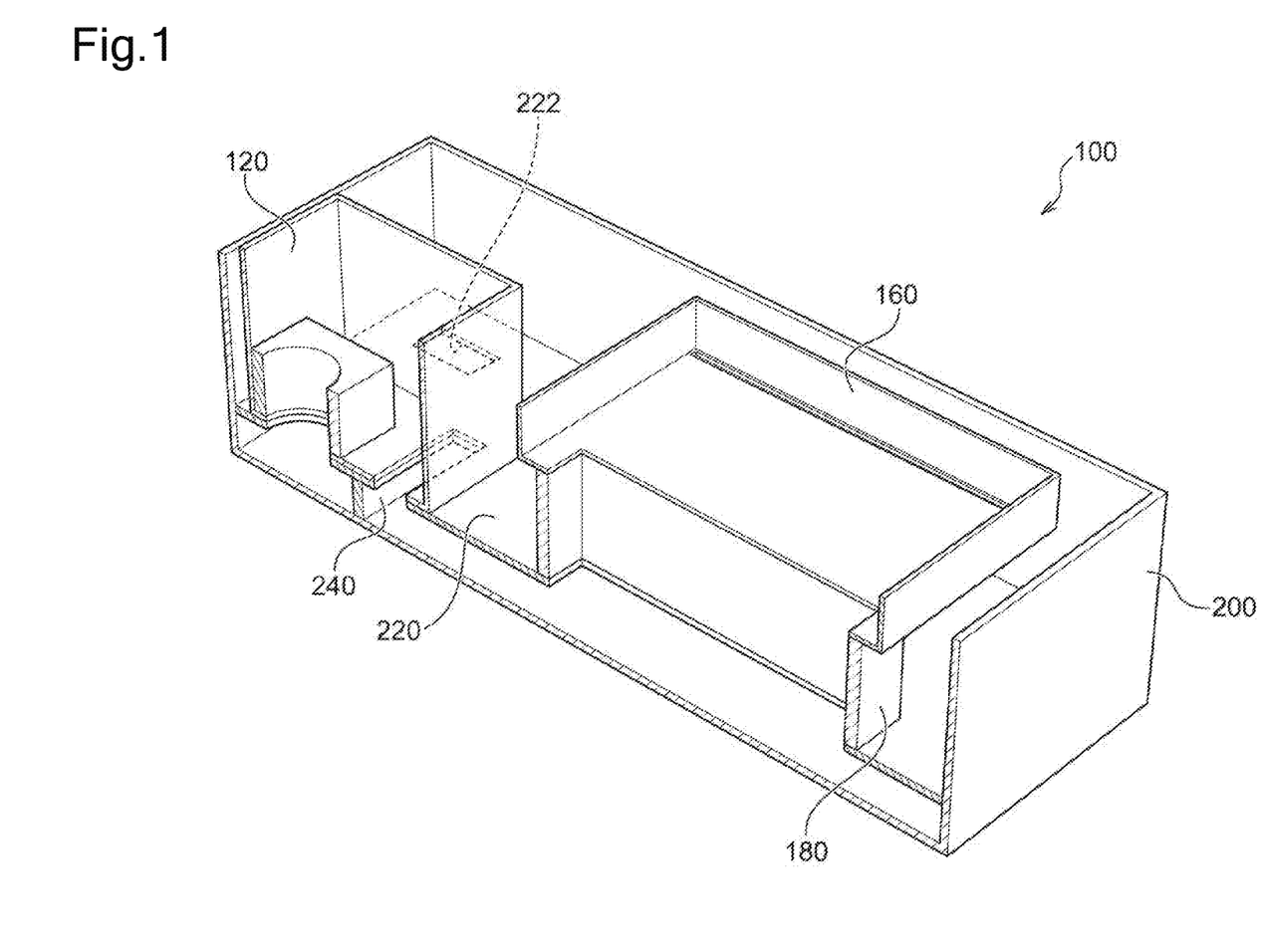
FIG. 1 is a cross-sectional perspective view of a soldering apparatus according to a first embodiment of the present invention.
Figure 2:
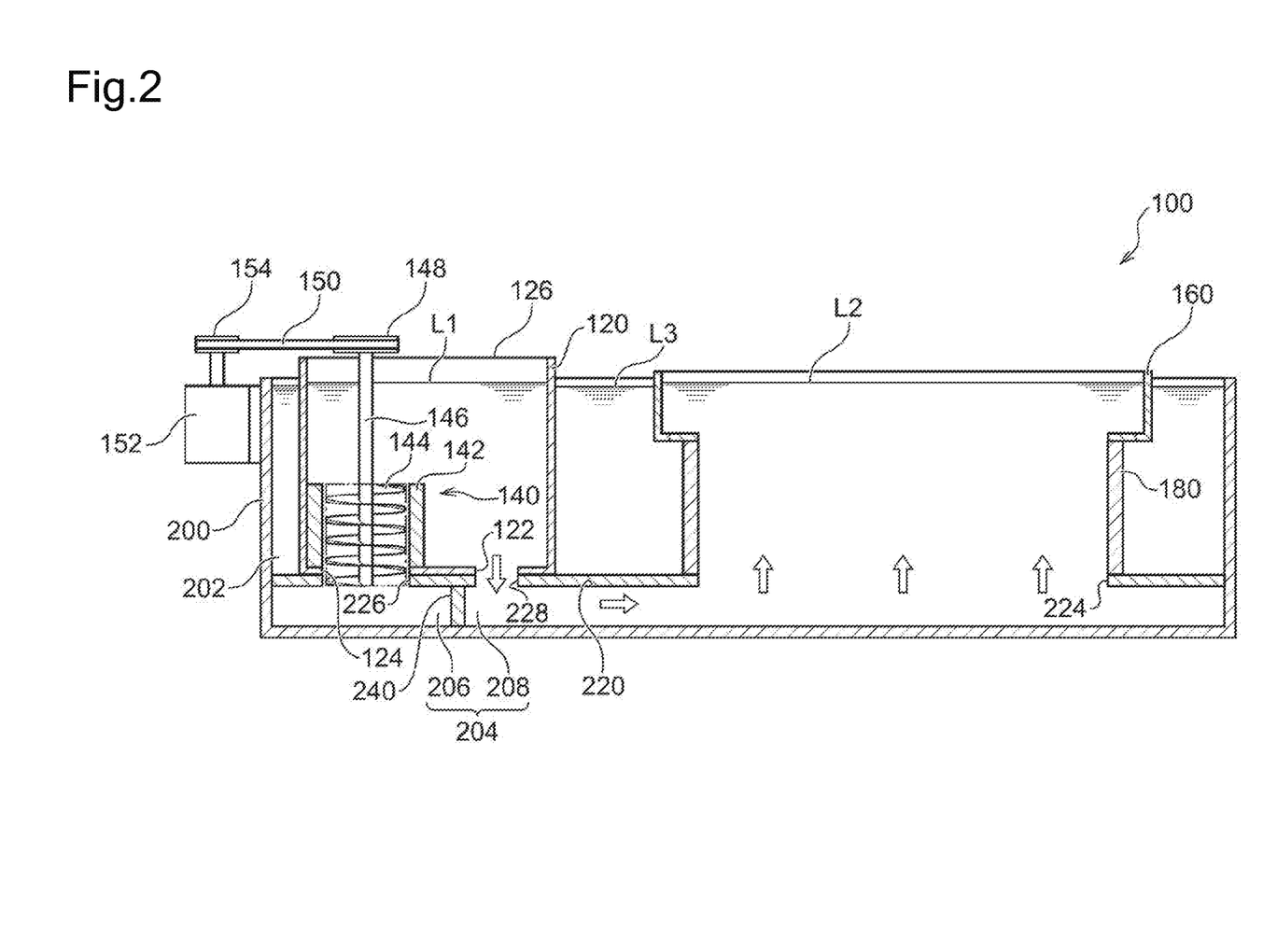
FIG. 2 is a cross-sectional view of the soldering apparatus illustrated in FIG. 1.
Figure 3:
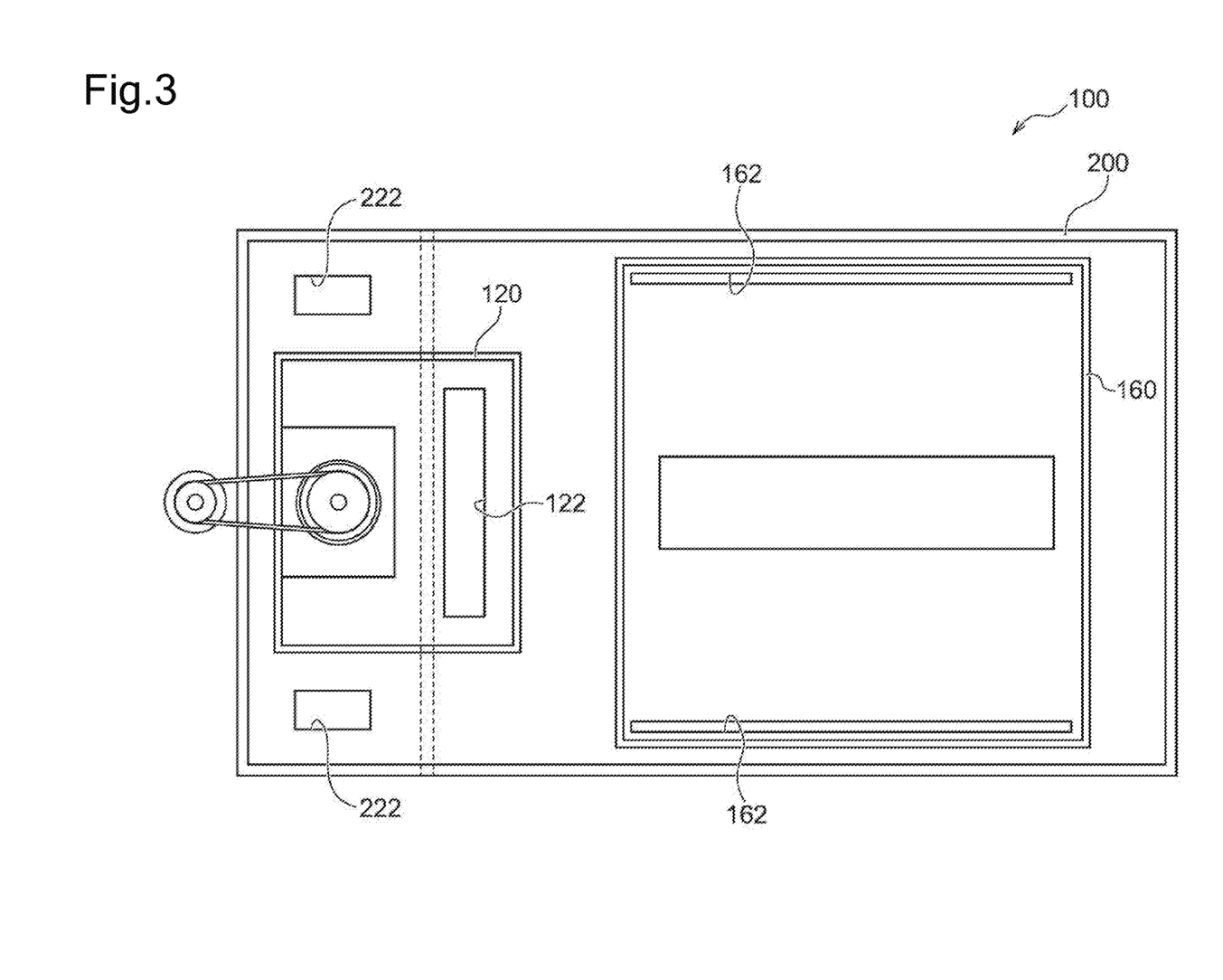
FIG. 3 is a plan view of the soldering apparatus illustrated in FIG. 1.

FIG. 1 is a cross-sectional perspective view of a soldering apparatus according to a first embodiment of the present invention. FIG. 2 is a cross-sectional view of the soldering apparatus illustrated in FIG. 1. FIG. 3 is a plan view of the soldering apparatus illustrated in FIG. 1.

Referring to FIG. 1, a soldering apparatus 100 includes a chamber 120, a pump 140 (see FIG. 2), an inner bath 160, a solder outlet portion 180, an outer bath 200, a base plate 220, and a shield plate 240. As an example, the soldering apparatus 100 is a circulation-dip soldering apparatus that solders an electronic component 320 on a substrate 300 (see FIG. 4). Note that, in FIG. 1, for the sake of easy viewing, the pump 140 is omitted.

The constituent elements of the soldering apparatus 100 are described below with reference to FIG. 2.

The chamber 120 is, as an example, a solder-containing container having a rectangular parallelepiped box shape. Moreover, the chamber 120 includes, as an example, an opening 122 for discharging the solder, an inlet port 124, and a ventilation port 126 communicated with atmosphere. The opening 122 and the inlet port 124 are, as an example, positioned on the bottom surface of the chamber 120. Moreover, the ventilation port 126 is, as an example, positioned on the upper surface of the chamber 120.

The pump 140 is, as an example, a screw pump. The pump 140, as an example, has a function of transporting the solder from a lower side to an upper side in the direction of gravity, and sucks the solder through the inlet port 124. Therefore, the pump 140 can transport the solder from a first lower portion 206 to the chamber 120. More specifically, the pump 140 includes a cylinder 142, a screw 144, a shaft 146, a shaft pulley 148, a belt 150, a motor 152, and a motor pulley 154. The cylinder 142 is a block having a cylindrical shape with a hole, and is set on the bottom surface of the chamber 120. The screw 144 is arranged in the hole of the cylinder 142, and the shaft 146 is fixed to the screw 144. The shaft 146 extends in the direction of gravity, and the shaft pulley 148 is attached to an upper part of the shaft 146. Moreover, the shaft pulley 148 and the motor pulley 154 are linked via the belt 150. Therefore, the shaft pulley 148 rotates in conjunction with the rotation of the motor 152. The motor 152 is attached to a wall surface of the outer bath 200.

The outer bath 200 is, as an example, a container having a rectangular parallelepiped box shape, and contains the chamber 120, the inner bath 160, and the solder outlet portion 180. Moreover, the upper side of the outer bath 200 is open.

The base plate 220 divides the interior of the outer bath 200 into an outer bath upper portion 202 and an outer bath lower portion 204. Moreover, the base plate 220 includes two solder intake ports 222 (see FIG. 3) that link the outer bath upper portion 202 and the outer bath lower portion 204, an inner bath coupling port 224 communicated with the inner bath 160, a chamber coupling port 226 communicated with the chamber 120, and an opening coupling port 228 communicated with the opening 122.

The shield plate 240 divides the outer bath lower portion 204 into the first lower portion 206 and a second lower portion 208. In the position of the first lower portion 206 of the base plate 220, the solder intake port 222 (see FIG. 3) and the chamber coupling port 226 are provided. Thus, the solder flowing into the first lower portion 206 through the solder intake port 222 can outflow through the chamber coupling port 226. In other words, the first lower portion 206 has a flow passage from the solder intake port 222 to the chamber coupling port 226. Meanwhile, in the position of the second lower portion 208 of the base plate 220, the opening coupling port 228 and the inner bath coupling port 224 are provided. Thus, the solder flowing into the second lower portion 208 through the opening coupling port 228 can outflow through the inner bath coupling port 224. In other words, the second lower portion 208 has a flow passage from the opening coupling port 228 to the inner bath coupling port 224.

The solder outlet portion 180 is a cylindrical body having a rectangular shape in cross-section, and is placed on the base plate 220. Moreover, the solder outlet portion 180 connects the inner bath coupling port 224 and the inner bath 160. Thus, the solder outlet portion 180 forms a flow passage from the inner bath coupling port 224 to the inner bath 160.

The inner bath 160 is, as an example, a container having a rectangular parallelepiped box shape. The inner bath 160 communicates with the opening 122 via the opening coupling port 228, the second lower portion 208, the inner bath coupling port 224, and the solder outlet portion 180. Therefore, the solder outflowing through the opening 122 is fed to the inner bath 160. Then, the inner bath 160 can contain the solder. Note that the space between the opening 122 and the inner bath 160 is, as an example, filled with the solder, and the solder does not contact air in this space. Moreover, the solder contained in the inner bath 160 forms liquid surface L2. Moreover, the upper side of the inner bath 160 is open to receive the substrate 300 and a palette 102, which are conveyed during soldering (see FIG. 4). The soldering apparatus 100 can perform soldering on the substrate 300 by immersing the lower surface of the substrate 300 into the liquid surface L2 in the inner bath 160. In other words, the inner bath 160 has a function of performing soldering using the solder fed through the opening 122. Note that the soldering operation of the soldering apparatus 100 will be described below. Moreover, the inner bath 160 includes two discharge holes 162 for discharging the contained solder in the bottom surface (see FIG. 3). The discharge hole 162 is, as an example, a slit. Because the inner bath 160 is contained in the outer bath 200, the solder discharged through the discharge holes 162 (see FIG. 3) of the inner bath 160 moves to the outer bath upper portion 202. That is, the outer bath upper portion 202 can receive the solder discharged through the discharge hole 162.

<Operation>

Next, the operation in which the soldering apparatus 100 circulates the molten solder and the soldering operation of the soldering apparatus 100 are described.

(Operation in which the Soldering Apparatus 100 Circulates the Molten Solder)

The operation in which the soldering apparatus 100 circulates the molten solder is described with reference to FIG. 2. When the soldering apparatus 100 circulates the molten solder, the soldering apparatus 100 first rotates the motor 152. Thus, the screw 144 is rotated, and the pump 140 transports the solder of the first lower portion 206 into the chamber 120. Then, the solder in the chamber 120 increases, and the height of the liquid surface L1 of the solder in the chamber 120 rises. Therefore, with an increase in solder in the chamber 120, the pressure of the opening 122 rises. Then, the raised pressure pumps the solder through the opening 122. At this time, the liquid surface L1 in the chamber 120 and the liquid surface L2 of the inner bath 160 are both in communication with the atmosphere. Therefore, the height of the liquid surface L2 rises to be equal to the height of the liquid surface L1. In other words, when the pump 140 is driven, the solder in the chamber 120 is fed to the inner bath 160 and is contained in the inner bath 160. Thereafter, the solder contained in the inner bath 160 is discharged through the discharge holes 162 (see FIG. 3) of the inner bath 160 and moves to the outer bath upper portion 202. Then, the outer bath upper portion 202 receives the discharged solder. Note that, at this time, the position of the liquid surface L3 of the solder in the outer bath upper portion 202 is set in a position higher than the position of the discharge holes 162. That is, the discharge holes 162 are positioned in the solder liquid. Thereafter, the solder moves along the outer bath upper portion 202 to the solder intake port 222 (see FIG. 3) of the base plate 220. Then, the solder in the outer bath upper portion 202 is fed to the first lower portion 206 through the solder intake port 222. Thereafter, the solder accumulated in the first lower portion 206 is again transported into the chamber 120 by the pump 140. Thus, in the soldering apparatus 100, the solder is circulated inside.

(Soldering Operation of the Soldering Apparatus 100)

Figure 4:
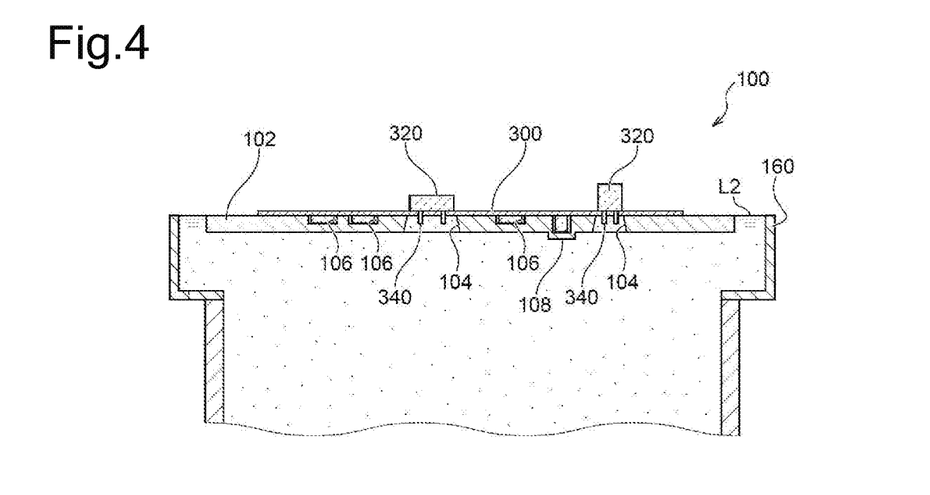
FIG. 4 is a cross-sectional view of an inner bath of the soldering apparatus illustrated in FIG. 1 during soldering.

Next, the soldering operation of the soldering apparatus 100 is described with reference to FIG. 4. FIG. 4 is a cross-sectional view of the inner bath 160 of the soldering apparatus 100 illustrated in FIG. 1 during soldering. During soldering, the substrate 300 is transported to the inner bath 160 in a state of being placed on the palette 102 by an existing conveyance apparatus (illustration omitted). The palette 102 includes a through-opening 104 corresponding to a soldered portion 340 of the substrate 300. Therefore, when the palette 102 is transported into the inner bath 160, the soldered portion 340 of the substrate 300 contacts the solder via the through-opening 104. Thus, the soldering apparatus 100 performs soldering on the soldered portion 340 of the substrate 300. Note that the palette 102 includes a plurality of recesses 106 and a cover 108 corresponding to the arrangement conditions of the electric component 320 of the substrate 300. Thus, the palette 102 prevents a portion of the substrate 300 other than the soldered portion 340 from contacting the solder. Thus, the soldering apparatus 100 performs soldering on the substrate 300 using the palette 102. In other words, the soldering apparatus 100 can perform what is known as mask palette soldering.

<Operation and Effect>

Next, operations and effects of the soldering apparatus 100 are described.

(First Effect)

As described above, dross the specific gravity of which is lower than that of the solder and floats near the liquid surface of the solder. Accordingly, the dross in the chamber 120 is positioned near the liquid surface L1 (see FIG. 2). Moreover, the opening 122 for discharging the solder is positioned in the bottom surface of the chamber 120. In other words, the opening 122 is positioned away from the liquid surface L1. Therefore, in order for the dross to pass through the opening 122, the dross needs to be once submerged from the vicinity of the liquid surface L1 of the solder to the position away from the liquid surface L1 where the opening 122 is present. That is, with the soldering apparatus 100, it is difficult to pass the dross through the opening 122 together with the solder, and the dross hardly pass through the opening 122. Therefore, the soldering apparatus 100 can feed the solder that scarcely contains the dross to the inner bath 160. Then, the soldering apparatus 100 can perform soldering in the inner bath 160 using the solder. In other words, with the soldering apparatus 100, the dross hardly adheres to the substrate 300.

(Second Effect)

A second effect is an effect obtained as the soldering apparatus 100 includes the pump 140 for transporting the solder from a lower side to an upper side in the direction of gravity.

Unlike the soldering apparatus 100, when the pump transports the solder from the upper side to the lower side in the direction of gravity, the pump sucks the solder on the upper side. In other words, the pump tends to suck the dross positioned near the liquid surface of the solder. Therefore, the pump can suck a lot of dross together with the solder. Then, when the pump sucks the dross, the pump cannot transport the solder for the amount of the sucked dross. In other words, the amount of solder to be transported by the pump is reduced, and the efficiency of transport can be reduced.

Furthermore, when the pump transports a lot of dross into the chamber, the density of the dross in the chamber also increases. In this case, the dross tends to pass through the opening 122 of the chamber.

However, in the soldering apparatus 100, the pump 140 transports the solder from the lower side to the upper side in the direction of gravity. In other words, the pump 140 sucks the solder at the position away from the liquid surface. Therefore, in the soldering apparatus 100, the pump 140 hardly sucks the dross, and therefore a reduction in transport efficiency of the pump 140 can be suppressed. Moreover, in the soldering apparatus 100, the pump 140 hardly sucks the dross, and an increase in density of the dross in the chamber 120 can be suppressed. As a result, the amount of dross that passes through the opening 122 can be reduced, and adhesion of the dross to the substrate 300 can be prevented.

(Third Effect)

In the soldering apparatus 100, if the chamber 120 does not include the ventilation port 126, the solder fed to the chamber 120 by the pump 140 is pumped through the opening 122 by the pressure generated by the pump 140. Therefore, the dross positioned near the liquid surface of the solder in the chamber 120 becomes more likely to be carried away by the pressure generated by the pump 140 to pass through the opening 122.

However, the chamber 120 of the soldering apparatus 100 includes the ventilation port 126. Thus, the solder fed to the chamber 120 by the pump 140 is once accumulated in the chamber 120. Then, as a result of an increase in solder in the chamber 120, the pressure of the opening 122 rises, and the raised pressure pumps the solder through the opening 122. That is, the dross positioned near the liquid surface L1 of the solder in the chamber 120 is not pumped to the opening 122 by the pressure by the pump 140. Accordingly, the soldering apparatus 100, which includes the ventilation port 126, suppresses passage of the dross through the opening 122.

(Fourth Effect)

Moreover, when a pump pumps a liquid, the pressure applied to the liquid by the pump slightly varies, and waves can be formed in the pumped liquid. In particular, when the pump rotates at high speed, a large wave is formed in the pumped liquid. Accordingly, when the pump directly connected to a bath feeds solder to a bath, the liquid surface of the solder contained in the bath can be in a rippling state.

The soldering apparatus 100 includes the chamber 120 including the ventilation port 126 on a downstream side of the pump 140. Therefore, the solder fed to the chamber 120 by the pump 140 forms waves due to slight variations in pressure of the pump 140 on the liquid surface L1 of the solder in the chamber 120. However, a pressure corresponding to the height of the liquid surface L1 of the solder is uniformly applied to the solder of the opening 122 according to the Pascal's principle. Thus, the solder pumped through the opening 122 becomes a less disturbed, stable flow and is fed to the inner bath 160 through the solder outlet portion 180. That is, the soldering apparatus 100 can suppress waves on the liquid surface L2 of the solder in the inner bath 160.

(Fifth Effect)

Moreover, the inner bath 160 contains the solder and includes the discharge holes 162 (see FIG. 3) for discharging the contained solder in the bottom surface. Thus, the solder fed from the chamber 120 and contained in the inner bath 160 is discharged through the discharge holes 162 of the inner bath 160. Thus, the inner bath 160 contains a lot of solder that is freshly fed from the chamber 120 and scarcely contains the dross. Therefore, the soldering apparatus 100 can perform soldering using the solder, which scarcely contains the dross, in the inner bath 160, and can prevent soldering using the solder in which the dross is generated.

(Sixth Effect)

Moreover, as described above, in the soldering apparatus 100, the solder circulates in the soldering apparatus 100. Thus, the solder circulates by convection. Then, the soldering apparatus 100 can have a uniform temperature of the solder in the apparatus because of the convection of the solder, and feed the solder with stable temperature to the inner bath 160. In other words, the solder in the inner bath 160 can be stabilized at a temperature optimum for soldering. Therefore, the soldering apparatus 100 can perform soldering at a temperature optimum for soldering.

(Seventh Effect)

Moreover, when the molten solder circulates in the soldering apparatus 100, the discharge holes 162 are positioned in the solder liquid.

Thus, in the soldering apparatus 100, the solder can move from the inner bath 160 to the outer bath upper portion 202 without contact with the atmosphere. That is, in the soldering apparatus 100, when the solder moves from the inner bath 160 to the outer bath upper portion 202, the solder does not contact the atmosphere and oxidation of the solder can be prevented.

<Variations>

Next, variations of the soldering apparatus 100 are described.

(First Variation)

In the soldering apparatus 100, the chamber 120 includes the opening 122 in the bottom surface. However, the chamber 120 may include the opening 122 in a side surface. This is because the dross floats near the liquid surface L1, and, even when the opening 122 is present in a side surface, as long as the opening 122 is away from the liquid surface L1, the soldering apparatus 100 can suppress passage of the dross through the opening 122. Note that the opening 122 needs to be positioned below the liquid surface L1 of the solder in the chamber 120, and is preferably positioned near the bottom surface of the chamber 120.

(Second Variation)

Moreover, the pump 140 may not be a screw pump. The pump 140 may be any pump that can transport the solder, e.g., an impeller pump. This is because when the pump 140 can transport the solder to the chamber 120, the soldering apparatus 100 can feed the solder to the inner bath 160.

(Third Variation)

Moreover, the chamber 120 may not include the ventilation port 126. When the chamber 120 does not include the ventilation port 126, as described above, the dross in the chamber 120 becomes more likely to be pumped through the opening 122 by the pressure generated by the pump 140. However, because the opening 122 is present in the bottom surface, the dross positioned near the liquid surface L1 still hardly outflow through the opening 122.

(Fourth Variation)

Moreover, the soldering apparatus 100 is a circulation-dip soldering apparatus that performs soldering using the palette 102. However, the soldering apparatus 100 may be a jet soldering apparatus. In this case, in the soldering apparatus 100, the inner bath 160 includes a jet nozzle, and the jet nozzle jets the solder fed through the opening 122. Thus, the soldering apparatus 100 can perform jet soldering using a jet from the jet nozzle.

(Fifth Variation)

Moreover, the soldering apparatus 100 may be a local soldering apparatus. In this case, in the soldering apparatus 100, the inner bath 160 includes a jet soldering nozzle that jets solder to an area where soldering is needed. Thus, the jet soldering nozzle can locally jet the solder to a component that requires soldering. That is, the soldering apparatus 100 can perform local soldering using the jet solder nozzle.

(Sixth Variation)

The discharge holes 162 are a slit. However, the discharge holes 162 may be an opening having any shape, e.g., circle or polygon. This is because even when the discharge holes 162 are an opening having such a shape, the discharge holes 162 can discharge the solder contained in the inner bath 160.

The embodiment and the variations of the present invention have been described heretofore. It is needless to say that the aforementioned examples are for the sake of easy understanding of the present invention and do not limit the present invention. The present invention can be properly changed and modified without departing from the gist, and the present invention includes equivalents. Moreover, any combination or omission of the constituent elements described in the claims and the specification may be made as long as at least some of the aforementioned problems can be solved or at least some of the effects can be provided.

REFERENCE SIGN LIST

100: soldering apparatus
102: palette
120: chamber
122: opening
124: inlet port
126: ventilation port
140: pump
160: inner bath
162: discharge hole
180: solder outlet portion
200: outer bath
202: outer bath upper portion
204: outer bath lower portion
206: first lower portion
208: second lower portion
220: base plate
222: solder intake port
224: inner bath coupling port
226: chamber coupling port
228: opening coupling port
240: shield plate
300: substrate
320: electronic component
340: soldered portion
L1: liquid surface
L2: liquid surface
L3: liquid surface

What is claimed is:

1. A soldering apparatus comprising:
a chamber configured to contain solder and including an opening that is configured to discharge the solder and that is present in a bottom surface of the chamber;
a pump configured to transport the solder to the chamber; and
an inner bath configured to communicate with the opening and perform soldering using the solder fed through the opening,
wherein
the inner bath contains the solder and includes a discharge hole configured to discharge the contained solder in a bottom surface of the inner bath.

2. The soldering apparatus according to claim 1, wherein the pump includes a cylinder with a hole and a screw arranged in the hole;
the pump transports the solder from a lower position to a higher position relative to gravity by a rotation of the screw.

3. The soldering apparatus according to claim 1, wherein the pump comprises a screw pump.

4. The soldering apparatus according to claim 1, wherein the chamber includes a ventilation port configured to communicate with atmosphere.

5. A soldering apparatus comprising:
a chamber configure to contain solder and including an opening configured to discharge the solder in a bottom surface or a side surface of the chamber;
a pump configured to transport the solder to the chamber; and
an inner bath configured to communicate with the opening and perform soldering using the solder fed through the opening;
an outer bath;
a base plate configured to divide an interior of the outer bath into an outer bath upper portion configured to receive the solder discharged through the discharge hole and an outer bath lower portion, the base plate including:
a solder intake port configured to link the outer bath upper portion and the outer bath lower portion,
an inner bath coupling port configured to communicate with the inner bath,
a chamber coupling port configured to communicate with the chamber, and
an opening coupling port configured to communicate with the opening; and
a shield plate configured to divide the outer bath lower portion into a first lower portion configured to include a flow passage from the solder intake port to the chamber coupling port and a second lower portion configured to include a flow passage from the opening coupling port to the inner bath coupling port, wherein the inner bath contains the solder and includes a discharge hole configured to discharge the contained solder in a bottom surface of the inner bath, and wherein the pump transports the solder from the first lower portion to the chamber.

6. A soldering method comprising:

discharging solder through an opening that is present in a bottom surface of a chamber that is configured to contain the solder;

transporting the solder to the chamber by a pump;

performing soldering using the solder fed through the opening to an inner bath configured to communicate with the opening; and discharging the contained solder through a discharge hole positioned in a bottom surface of the inner bath.

* * * * *